Aug. 11, 1953
M. J. COHEN
2,648,818
GAS PRESSUE MEASURING
Filed Oct. 14, 1950
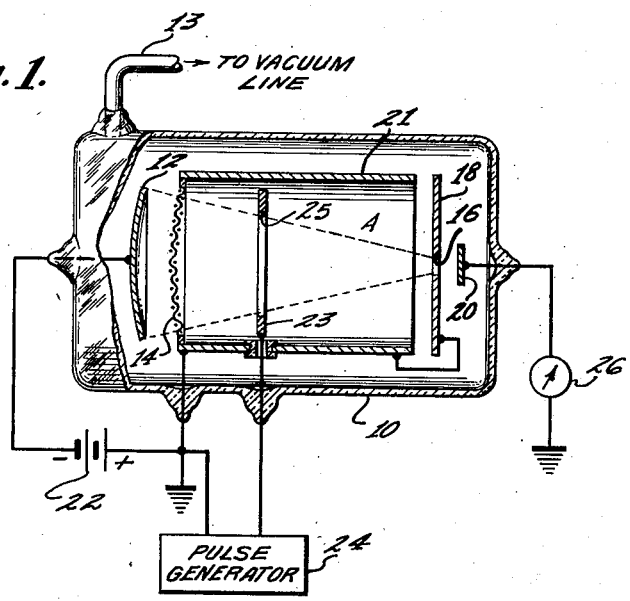
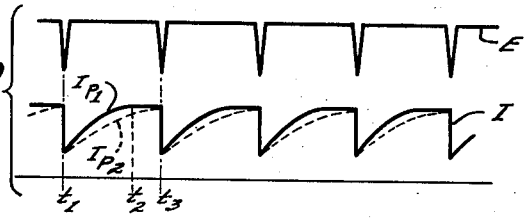
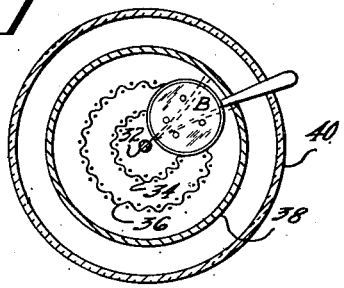
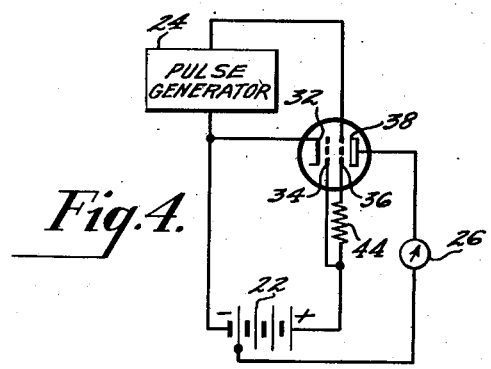
Inventor
Martin J. Cohen
By
Attorney Patented Aug. 11, 1953

2,648,818

UNITED STATES PATENT OFFICE 2,648,818

GAS PRESSURE MEASURING

Martin J. Cohen, Princeton, N. J., assignor to Radio Corporation of America, a corporation of Delaware Application October 14, 1950, Serial No. 190,228

12 Claims. (Cl. 324—33)

This invention relates to improvements in methods of and apparatus for gas pressure measuring, and particularly to improved gas pressure measuring techniques utilizing the space-charge-neutralizing effects of gas ions on an electron beam.

It is, of course, well known that electrons impinging on gas molecules can cause ionization thereof under suitable conditions. This phenomenon has been used extensively for gas pressure measuring by means of so-called ionization gauges.

In an ordinary ionization gauge, an electron current is passed between two electrodes immersed in the gas to be measured to cause ionization thereof. A third electrode is immersed in the gas and maintained at a negative potential to collect ions, with the ion current being measured as a measure of the gas pressure. While this arrangement is satisfactory for some applications, various factors, such as "leakage currents" flowing to the ion collecting electrode, and the decreasing magnitude of ion currents with decreasing gas pressure, set a relatively high minimum on the gas pressures than can be measured in this way. It is, therefore, a general object of the present invention to provide an improved gas measuring method and apparatus which involves a gas ionization principle, but which avoids many of the limitations of the conventional ionization gauge.

A more specific object of the invention is the provision of an improved ionization method of and apparatus for gas pressure measuring wherein measurements can be made by study of an electron current rather than an ion current.

In accordance with the invention, the foregoing and other related objects and advantages are attained by utilizing ions of the gas being measured to neutralize space charge effects in an electron beam. More specifically, the space charge neutralizing ions are periodically removed from the electron beam to cause dispersal thereof. As will be shown hereinafter, resultant changes in electron currents flowing to one or more of the electron tube electrodes then can be measured as a measure of gas pressure.

A more complete understanding of the invention can be had by reference to the following description of an illustrative embodiment thereof, when considered in connection with the accompanying drawing, wherein:

Figure 1 is a partially perspective and partially schematic view of a gas pressure measuring apparatus embodying the principles of the invention, Figure 2 is a graph showing certain of the voltage and current waveforms in the apparatus of Fig. 1, Figure 3 is a cross-section view of an electron tube suitable for use in an apparatus such as is shown in Fig. 1, although differing structurally from the tube shown in Fig. 1, and Figure 4 is a circuit diagram illustrating the use of the tube shown in Fig. 3 in practicing the principles of the invention.

Referring to Fig. 1 of the drawing, there is shown an electron tube 10 in which a beam of electrons, shown in broken lines, can be drawn from a cathode 12 and projected through an accelerator grid 14 toward an aperture 16 in a shield electrode 18. In back of the aperture 16 there is placed a collector electrode 20, while a cylindrical electrode 21 extends along the space A between the grid 14 and the shield 18.

Inside the cylinder 21, an auxiliary disc-shaped electrode 23 is placed between the grid 14 and the shield 18, and has a central opening 25 much larger than the cross-sectional area of the electron beam.

A voltage source, shown as a battery 22, is connected to make the grid 14 positive with respect to the cathode 12. The other electrodes 18, 20, 21, 23 normally are kept at substantially the same potential as the grid 14.

The cathode 12 and the grid 14 are in the shape of sections of spherical surfaces having their centers of curvature at the center of the shield aperture 16. Thus, when voltage is applied between the grid 14 and cathode 12, as shown, a beam of electrons will be established, flowing from the cathode 12 through the grid 14 and toward the shield aperture 16.

In general, the number of electrons that can pass through the aperture 16 to the collector 20 is limited by the "space charge" effect of the electrons themselves. That is, the cumulative effect of the negative electron charges in the beam is to establish a potential gradient along a line at right angles to the beam. This potential gradient will have its most negative point at the center of the beam, and will extend radially outwardly. The effect of this space charge is to tend to disperse the beam, which prevents perfect focusing thereof at the shield aperture 16. Thus, under the conditions thus far described, only a part of the total cathode emission current would pass through the aperture 16 to the collector 20. The rest of the beam current would be intercepted by the shield 18.

If there are gas molecules in the tube 10, some of these molecules will be struck by electrons in the beam, creating positive ions. If these positive ions are allowed to remain in the area between the grid 14 and the shield 18, they will have the effect of neutralizing or offsetting the electron-created space charge. This neutralization will reduce the dispersing or defocusing effect of the space charge, so that less electron current will flow to the shield 18 and more electron current will flow to the collector 20.

It can be seen that the space charge neutralization just described will be effective only if the ions can remain in the grid-shield space A. If this space A is substantially field-free (i. e. no potential difference between the grid 14 and the shield 18), then the ions will be "trapped" therein.

Even at the lowest gas pressures attainable, the electron current through the aperture 16 under conditions of space-charge-neutralization is independent of gas pressure. Therefore, a measurement of collector current, as such, ordinarily will not provide an indication of gas pressure in the tube 10. However, it has been found that if the ions are "swept out" of the normally field free space A, the time required for space-charge-neutralization to be reestablished (i. e., the "ion build-up time") will be a function of gas pressure in the tube 10. In accordance with the present invention, this phenomenon is utilized as a basis for the measurement of gas pressure.

In the specific apparatus illustrated in Fig. 1, a source of negative voltage pulses 24 is connected to the auxiliary electrode 23. A current measuring device, such as a milliammeter 26, is connected in circuit with the collector electrode 20. In Fig. 2, there is shown on a common time base the waveform E of the voltage pulses applied to the auxiliary electrode 23, and the collector current waveform $I_{p1}$ and $I_{p2}$ for two different gas pressures $p_1$ and $p_2$.

Referring to Fig. 2, waveform E shows the auxiliary voltage dropping suddenly at time $t_1$. At that instant, the collector current also drops sharply as ions are drawn from the space A in the tube 10 of Fig. 1. At this time, the collector current will be a space-charge-limited current. Thereafter, the collector current waveform will follow a path determined by the gas pressure. Thus, for some given pressure $p_1$, the collector current will increase along a line $I_{p1}$, until new ions have neutralized the space charge (at time $t_2$). For a lower gas pressure $p_2$, the collector current will rise more slowly along a line $I_{p2}$ between the times $t_1$ and $t_3$. It is this time interval ($t_1$—$t_2$ or $t_1$—$t_3$) that varies with and indicates the gas pressure. Observation of the collector current waveform, as with an oscilloscope or the like, can be used as a measure of the time required for new ions to form, and hence, a measure of the gas pressure. However, the oscilloscope pattern is not always convenient or easy to interpret. Therefore, it is deemed preferable to measure the average electron current flowing to the collector 20 (or to the shield 18). It can be seen by examination of Fig. 2 that the average value of the currents represented by the waveforms $I_{p1}$ and $I_{p2}$ will be different. Therefore, these average current values, as indicated by the meter 26, will be indicative of the pressure in the tube 10.

In a typical case, the tube 10 will be connected through a conduit 13 to a pressurized or evacuated system in which the pressure is to be measured.

As was stated, it has been found that extremely small quantities of gas in the tube 10 will provide space charge neutralization. This means, of course, that the change from space charge limited to space charge neutralized current will be as apparent at very low pressures as it will at higher pressures. Therefore, accurate measurements can be made, in accordance with the invention, at much lower pressures than with more conventional ionization gauges.

It should be noted that the auxiliary electrode 23 is not essential to successful practice of the invention. For example, the grid 14 could receive the negative "ion-elimination" pulses. However, the use of the auxiliary electrode 23 is deemed preferable as it will offer a higher impedance to the pulse generator 24 than would the grid 14. That is, the auxiliary electrode 23 will only have to collect the ions to cause the electron beam to defocus. On the other hand, a negative pulse applied to the grid 14 would have to reduce the potential on the grid which collects a part of the electron beam. The lower grid potential would cause less current to flow, and the excess ions in the beam would disperse. When the grid potential is restored the beam would be defocussed.

While the tube 10 shown in Fig. 1 will operate satisfactorily, it has one feature which may prove objectionable under some circumstances. In general, it is customary to use oxide-coated surfaces for cathodes having comparatively large emitting surfaces such as the cathode 12. Unfortunately, an oxide coated cathode will not stand up well under ion bombardment, and although it is contemplated that most of the ions will be generated in the ion-trapping space A, some positive ions also will be generated in the cathode-grid space. These ions will be attracted to and bombard the negatively polarized cathode 12, and may cause rather rapid deterioration thereof at pressures above, say, $10^{-3}$ millimeters Hg. Also, it is important to be able to open the gauge to atmospheric pressure without "poisoning" the cathode.

An electron emitter which is much better adapted to withstand ion bombardment and exposure to atmospheric pressure is the so-called thoriated tungsten filament. In Fig. 3 there is shown a top cross section view of an electron beam tube in which a thoriated tungsten emitter can be used.

The tube shown in Fig. 3 comprises a filamentary cathode 32, surrounded by first and second grid structures, 34 and 36, respectively, and a cylindrical anode 38, all within an envelope 40. The grid structures 34, 36 may comprise either wire meshes or spiral wires, the only requirement being that the individual wires of the grids be aligned so that the wires of the second grid 36 are shaded from the cathode 32 by the wires of the first grid 34. This is shown at point B in Fig. 3 where the grid wires have been enlarged to clarify the illustration. If the two grids 34, 36 are kept normally at substantially the same potential to provide an ion trapping space therebetween, electrons will flow in beams from the cathode 32 toward the anode 38 as shown at B in Fig. 3. Due to the shading effect provided by the first grid 34, very few electrons will strike the second grid 36 as long as there are ions present to provide space charge neutralization. However, if these neutralizing ions are removed, then the electron paths will diverge after passing the first grid 34, so that many more electrons will strike the wires of the second grid 36. This will decrease the anode electron current and increase the second grid electron current.

Figure 4 is a schematic diagram of a gas pressure measuring apparatus embodying the principles of the invention and utilizing the tube shown in Fig. 3. In the circuit of Fig. 4, a voltage source 22 is connected to make the tube cathode 32 negative with respect to the grids 34, 36. The tube anode 38 is connected to the voltage source 22 so as to be slightly positive with respect to the cathode 32 but preferably negative with respect to the grids 36, 34. This will tend to increase the anode current change between conditions of space charge limited and space charge neutralized current. The second grid 36 is connected to a negative pulse source 24, and, hence, serves as an auxiliary electrode similar to the electrode 23 in the tube shown in Fig. 1. An isolating resistor 44 is connected between the first and second grids 34, 36. A measuring device such as a meter 26 is connected in the anode circuit to measure the average anode current.

The circuit shown in Fig. 4 will operate in substantially the same way as that shown in Fig. 1. The average anode current will be a function of the gas pressure inside the envelope 40 due to the time required for ion "build-up," as previously described.

As a variation of the method and apparatus already described, it should be noted that gas pressure measurements also can be made in accordance with the invention by using variable frequency pulses to "sweep out" the space charge neutralizing ions. That is, as the gas pressure varies, it is possible to vary the pulse rate so that the anode current and/or the auxiliary electrode current will remain essentially constant. Under these conditions, the pulse rate at any given time will be a function of and a measure of the gas pressure at that time.

It will, of course, be understood that the present invention is not limited to the specific structural details shown in the accompanying drawing, and accordingly, the foregoing is to be construed as illustrative, and not in a limiting sense.

What is claimed is:

1. Apparatus for measuring gas pressure, said apparatus comprising electron beam generating means for projecting a beam of electrons through the gas to be measured, a collecting electrode disposed in the path of said beam, means defining a substantially field-free space between said collecting electrode and said beam generating means wherein to develop by electron bombardment ions of the gas to be measured so as to neutralize space charge effects due to the electrons in said beam, means including an electrode adjacent to said field-free space to periodically remove said ions from said field-free space, and means in circuit with said collecting electrode for measuring the effect of said periodic ion removal on the current flowing to said collecting electrode as a measure of the pressure of said gas.

2. Apparatus as defined in claim 1 including an apertured shielding electrode interposed between said beam generating means and said collecting electrode.

3. Apparatus as defined in claim 1 wherein said space defining means includes said electrode adjacent to said field-free space.

4. Apparatus as defined in claim 1 wherein said beam projecting means comprises a cathode and a first grid electrode, wherein said space defining means comprises said grid electrode and a second grid electrode, and wherein the elements of said grid electrodes are aligned so that said elements of said second grid electrode are shaded from said cathode by said elements of said first grid electrode.

5. Gas pressure measuring apparatus comprising an envelope adapted to be connected to a source of gas the pressure of which is to be measured, electrodes including a cathode electrode and a grid electrode within said envelope, means including said cathode and grid for generating a beam of electrons in said envelope, means establishing a substantially field-free space in the path of said beam, means including one of said electrodes to periodically remove gas ions from said field-free space, circuits connecting said cathode to each of the other of said electrodes, and measuring means in the circuit between said cathode and one of said electrodes to which electrons flow for measuring the effect of periodic ion removal on the electron current in said last named circuit.

6. Gas pressure measuring apparatus comprising an envelope, a cathode electrode in said envelope, an electron collecting electrode spaced from said cathode, a centrally apertured shield electrode disposed between said cathode and said collecting electrode adjacent to said collecting electrode, said cathode electrode being in the shape of a spherical section having its center of curvature at the center of the aperture in said shield electrode, a grid electrode disposed between said shield electrode and said cathode adjacent to said cathode, a voltage source connected between said cathode and said grid to accelerate electrons from said cathode towards said collecting electrode through said grid, an apertured disc-shaped electrode disposed between said grid and said shield surrounding but outside of the path of said electrons, a pulse voltage source connected to said ring-shaped electrode, and current measuring means connecting said cathode to said collecting electrode.

7. In a gas pressure measuring apparatus, an envelope, electron beam generating means for generating a beam of electrons in said envelope and including a cathode electrode and an accelerating electrode, a collector electrode disposed in the path of the electron beam generated by said beam generating means, means defining a normally substantially field-free space through which said beam passes in traveling from said beam generating means toward said collector electrode, means to periodically establish a potential gradient in said normally field-free space for removing ions formed in said space, circuits connecting said space-defining means and said collector electrode to said cathode, and current measuring means connected in one of said circuits to measure the current flowing therein as a measure of the effect of ions in said space on the current flowing in said one circuit.

8. The method of determining gas pressure within an envelope wherein there is provided a substantially field-free space, said method comprising the steps of generating a beam of electrons within said envelope, directing said electron beam through said space to develop therein ions of the gas to be measured, periodically removing said ions from said space, and measuring the time required for new ions to be developed in said space as a measure of the pressure of the gas in said envelope.

9. The method of gas pressure measuring defined in claim 8 wherein said time measuring step includes the steps of continuously collecting the electrons in a predetermined cross sectional area of said electron beam to develop an electron current and measuring the average value of said collected electron current.

10. In a method of gas pressure measuring wherein an electron beam is passed through the gas to be measured to produce ions of gas and wherein the gas ions so produced remain in the path of the beam thereby increasing the density of the beam, the steps of periodically eliminating said ions from said beam path to cause the electrons in the beam to diverge from said path due to the mutually repelling effect of said electrons, and measuring the time required for generation of new ions to neutralize said repelling effect as a measure of said gas pressure.

11. In a method of gas pressure measuring, the steps of generating a beam of electrons, directing said beam through the gas to be measured thereby creating ions of said gas, periodically removing said ions from the path of said beam, and measuring the average density of a predetermined cross-sectional portion of said beam.

12. In a method of measuring the gas pressure in an electron tube of the type having a plurality of electrodes including electrodes for generating a beam of electrons and an electron collecting electrode in the path of said beam, the steps of generating a beam of electrons in said tube to ionize said gas, periodically removing the ions so generated from said tube, measuring the average electron current flowing to one of said electrodes, and varying the period between removals of said ions to maintain said measured current at a constant value.

MARTIN J. COHEN.

References Cited in the file of this patent

UNITED STATES PATENTS

| Number | Name | Date |
|---|---|---|
| 2,501,702 | Varian | Mar. 28, 1950 |
| 2,516,704 | Kohl | July 25, 1950 |